(12) United States Patent
Matsumoto et al.

(10) Patent No.: US 9,195,039 B2
(45) Date of Patent: Nov. 24, 2015

(54) INVERTED MICROSCOPE INCLUDING CONDENSER POWER TRANSMISSION MECHANISM PROVIDED IN SUPPORT COLUMN AND ILLUMINATION SUPPORT PORTION

(75) Inventors: Yusuke Matsumoto, Hachioji (JP); Akihiro Kitahara, Hino (JP); Mika Fukuda, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 684 days.

(21) Appl. No.: 13/534,356

(22) Filed: Jun. 27, 2012

(65) Prior Publication Data

US 2013/0077158 A1 Mar. 28, 2013

(30) Foreign Application Priority Data

Sep. 26, 2011 (JP) .................................. 2011-209798
Mar. 29, 2012 (JP) .................................. 2012-077818

(51) Int. Cl.
*G02B 21/08* (2006.01)
*G02B 21/00* (2006.01)
*G02B 21/24* (2006.01)
*G02B 21/30* (2006.01)
*G02B 21/32* (2006.01)

(52) U.S. Cl.
CPC ............ *G02B 21/0088* (2013.01); *G02B 21/24* (2013.01); *G02B 21/241* (2013.01); *G02B 21/30* (2013.01); *G02B 21/32* (2013.01)

(58) Field of Classification Search
None
See application file for complete search history.

(56) References Cited

U.S. PATENT DOCUMENTS

| 4,704,013 | A | 11/1987 | Clark |
| 5,638,222 | A | 6/1997 | Shigehara |
| 6,123,459 | A | 9/2000 | Brinkmann et al. |
| 6,307,672 | B1 | 10/2001 | DeNure |
| 2009/0073551 | A1 | 3/2009 | Kato |
| 2010/0091363 | A1 | 4/2010 | Kawahito |

FOREIGN PATENT DOCUMENTS

| DE | 35 31 832 A1 | 3/1986 |
| DE | 196 42 796 A1 | 5/1997 |
| DE | 202 21 696 U1 | 6/2007 |

(Continued)

OTHER PUBLICATIONS

English Machine Translation of JP 11-218683 A.*

(Continued)

*Primary Examiner* — Derek S Chapel
(74) *Attorney, Agent, or Firm* — Holtz, Holtz, Goodman & Chick PC

(57) ABSTRACT

An inverted microscope includes: a stage which places a specimen thereon; a light source unit which has a light source irradiating light to the specimen on the stage; an objective lens which focuses at least observation light from the specimen on the stage; a body unit which holds at least the objective lens; a condenser which is provided on an optical axis of the objective lens; a condenser holding unit which holds the condenser; a condenser moving mechanism which movably supports the condenser holding unit and moves the condenser holding unit along the optical axis; a transmission mechanism which transmits power for moving the condenser to the condenser moving mechanism; and an input unit which inputs the power to the transmission mechanism. The input unit is provided above the condenser holding unit.

10 Claims, 14 Drawing Sheets

(56) References Cited

FOREIGN PATENT DOCUMENTS

| EP | 0 508 076 A1 | 10/1992 |
| EP | 1 630 586 A1 | 3/2006 |
| JP | 6-17939 B2 | 3/1994 |
| JP | 11-218683 A | 8/1999 |
| WO | WO 2005/096063 A1 | 10/2005 |

OTHER PUBLICATIONS

Extended European Search Report (EESR) dated Mar. 4, 2013 (in English) in counterpart European Application 12 004 680.0.
Partial European Search Report (PESR) dated Dec. 20, 2012 (in English) issued in counterpart European Application No. 12004680.0.

* cited by examiner

INVERTED MICROSCOPE INCLUDING CONDENSER POWER TRANSMISSION MECHANISM PROVIDED IN SUPPORT COLUMN AND ILLUMINATION SUPPORT PORTION

CROSS-REFERENCE TO RELATED APPLICATIONS

This application is based upon and claims the benefit of priority from Japanese Patent Application No. 2011-209798, filed on Sep. 26, 2011, and Japanese Patent Application No. 2012-077818, filed on Mar. 29, 2012, the entire contents of which are incorporated herein by reference.

BACKGROUND OF THE INVENTION

1. Field of the Invention

The present invention relates to an inverted microscope which carries out, for example, a transmitted-light illumination observation by transmitting illumination light through a specimen from the upside.

2. Description of the Related Art

Hitherto, as microscopes which are used for the cell research of biology and medicine, an inverted microscope has been used which carries out a transmitted-light illumination observation by transmitting illumination light through a specimen from the upside.

FIG. 16 is a schematic diagram illustrating an inverted microscope equipped with a transmitted-light illumination device of the related art. An inverted microscope 200 illustrated in FIG. 16 includes a stage 50 which places a specimen S of an observation subject thereon, a microscope body 52 which includes a focusing operation unit 521 for moving an objective lens 51 up and down, and a transmitted-light illumination device 53 which carries out a transmitted-light illumination. The transmitted-light illumination device 53 includes an illumination support column 54 which extends from the microscope body 52 in the vertical direction, an illumination arm portion 55 which extends in the substantially horizontal direction from the upside of the illumination support column 54 toward the optical axis (hereinafter, referred to as an optical axis N10) of the objective lens 51, a lamp housing 56 which is detachably attached to one end of the illumination arm portion 55 and includes a light source 561 for emitting illumination light to be irradiated to the specimen S, a condenser unit 57 which includes at least a condenser 571, and a condenser holder 572 which holds the condenser unit 57 and extends in a direction perpendicular to the extension direction of the illumination support column 54. Further, the inverted microscope 200 includes a lens barrel 58 which is provided on the microscope body 52 and is mounted with an ocular 581.

The illumination support column 54 includes a condenser moving mechanism 59 which is capable of moving the condenser holder 572 up and down along the optical axis N10. The condenser moving mechanism 59 is realized by, for example, the combination of a rack and a pinion, and includes a condenser focusing operation unit 591 which moves the condenser 571 up and down.

The illumination arm portion 55 includes a lens 551 which is provided on an optical axis N20 of the light source 561, a reflection mirror 552, and a field stop 553. Note that, the optical axis N20 is perpendicular to the optical axis N10. Further, the front surface of the illumination arm portion 55 is equipped with a field stop operation unit 554 capable of adjusting the field stop diameter of the field stop 553.

The light which is emitted from the light source 561 passes through the lens 551, the reflection mirror 552, and the field stop 553 arranged in the illumination arm portion 55, passes through the condenser 571, and is irradiated to the specimen S. The observation image which is obtained from the specimen S is increased or decreased in size by the objective lens 51, and is formed by an observation optical system (not illustrated). An observer observes the formed observation image through the ocular 581 which is mounted on the lens barrel 58.

By using the inverted microscope 200 having the above-described configuration, for example, the specimen image based on the light reflected from the specimen S may be observed (for example, see Japanese Examined Patent Publication No. 06-017939 and Japanese Laid-open Patent Publication No. 11-218683).

SUMMARY OF THE INVENTION

An inverted microscope according to an aspect of the invention includes: a stage which places a specimen thereon; a light source unit which has a light source irradiating light to the specimen on the stage; an objective lens which focuses at least observation light from the specimen on the stage; a body unit which holds at least the objective lens; a condenser which is provided on an optical axis of the objective lens; a condenser holding unit which holds the condenser; a condenser moving mechanism which movably supports the condenser holding unit and moves the condenser holding unit along the optical axis; a transmission mechanism which transmits power for moving the condenser to the condenser moving mechanism; and an input unit which inputs the power to the transmission mechanism, wherein the input unit is provided above the condenser holding unit.

An inverted microscope according to another aspect of the invention includes: a stage which places a specimen thereon; a light source unit which has a light source irradiating light to the specimen on the stage; an objective lens which focuses at least observation light from the specimen on the stage; a body unit which holds at least the objective lens; a condenser which is provided on an optical axis of the objective lens; a condenser holding unit which holds the condenser; a condenser moving mechanism which movably supports the condenser holding unit and moves the condenser holding unit along the optical axis; and a movement regulating unit which regulates a movement of the condenser holding unit in a direction parallel to the optical axis of the objective lens.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, exemplary embodiments of the invention will be described in detail with reference to the drawings. It is to be noted that, the invention is not limited to the following embodiments. Further, in the following description, respective drawings are merely used to schematically illustrate the shape, the size, and the positional relation so that the contents of the invention may be understood. Accordingly, the invention is not limited to the shape, the size, and the positional relation exemplified in the respective drawings. Further, in the respective drawings, a part of the hatching of the cross section is not illustrated in order to clarify the configuration. Furthermore, the numerical values exemplified below are merely appropriate examples of the invention, and hence the invention is not limited to the exemplified numerical values.

First Embodiment

Figure 1:
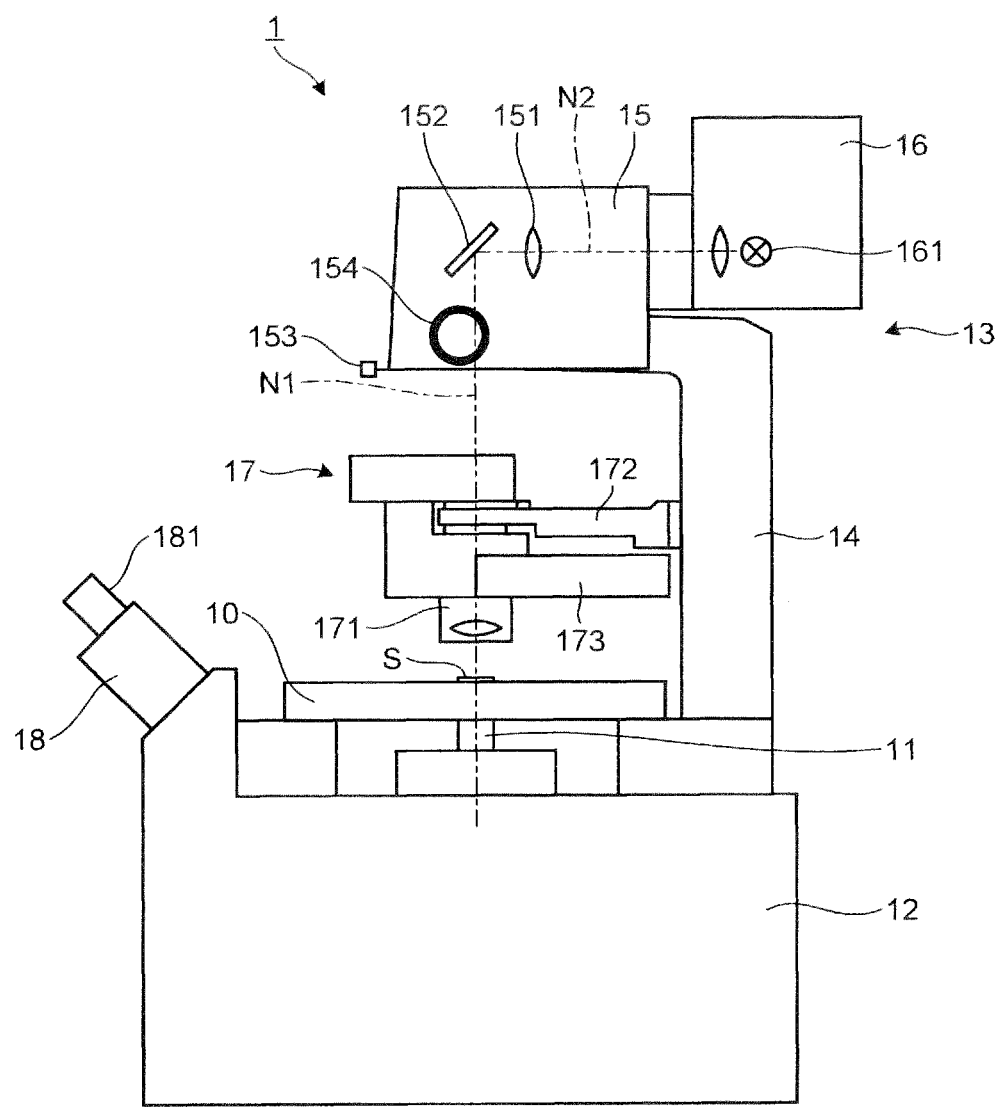
FIG. 1 is a schematic diagram illustrating an overall configuration of an inverted microscope according to a first embodiment of the invention.

First, an inverted microscope according to a first embodiment will be described in detail with reference to the drawings. FIG. 1 is a schematic diagram illustrating an overall configuration of the inverted microscope according to the first embodiment. As illustrated in FIG. 1, an inverted microscope 1 is an inverted microscope which observes a specimen S by forming a specimen image of the specimen S, and includes a stage 10 which places the specimen S of the observation subject thereon, an objective lens 11 which focuses observation light from the specimen S on the stage 10, a microscope body 12 (body unit) which holds the objective lens 11 and has an imaging optical system therein so as to form an image through the light incident to the objective lens 11, and a transmitted-light illumination device 13 which carries out a transmitted-light illumination.

The transmitted-light illumination device 13 includes an illumination support column 14 which extends upward from the microscope body 12 (in the vertical direction), an illumination arm portion 15 (illumination support portion) which extends in the substantially horizontal direction from the upper end portion of the illumination support column 14 toward the optical axis (hereinafter, referred to as an optical axis N1) of the objective lens 11, a lamp housing 16 (light source unit) which is detachably attached to one end of the illumination arm portion 15 and includes a light source 161 for irradiating illumination light to the specimen S, a condenser unit 17 which includes at least a condenser 171, and a condenser holder 172 which holds the condenser unit 17 and extends in a direction perpendicular to the extension direction of the illumination support column 14. Further, the condenser unit 17 includes a turret switching unit 173 which changes the type of optical elements in accordance with the observation method.

Further, the inverted microscope 1 includes a lens barrel 18 which is provided on the microscope body 12 and is mounted with an ocular 181.

The illumination arm portion 15 includes a lens 151, a reflection mirror 152, and a field stop on an optical axis N2 of the light source 161. Note that, the optical axis of the light from the light source 161 which is reflected by the reflection mirror 152 is perpendicular to the optical axis N2, and matches the optical axis N1 of the objective lens 11. Further, the front surface of the illumination arm portion 15 (the surface on the side of the observer (on the side of the ocular 181)) is equipped with a field stop operation unit 153 capable of adjusting the field stop diameter of the field stop. The illumination arm portion 15 includes a condenser focusing operation unit 154 (input unit) which moves the condenser 171 up and down. Note that, the condenser focusing operation unit 154 is provided near the end portion near the installation position of the field stop operation unit 153 at the end portion in the extension direction of the illumination arm portion 15. The observer adjusts the diaphragm by operating the field stop operation unit 153 when the specimen S placed on the stage 10 is observed through the transmitted-light illumination.

The light which is emitted from the light source 161 passes through the lens 151, the reflection mirror 152, and the field stop arranged in the illumination arm portion 15, passes through the condenser 171, and is irradiated to the specimen S. The observation light which is transmitted through the specimen S forms an image by an observation optical system (not illustrated) through the objective lens 11. The observer observes the formed observation image through the ocular 181 which is mounted on the lens barrel 18.

Figure 2:
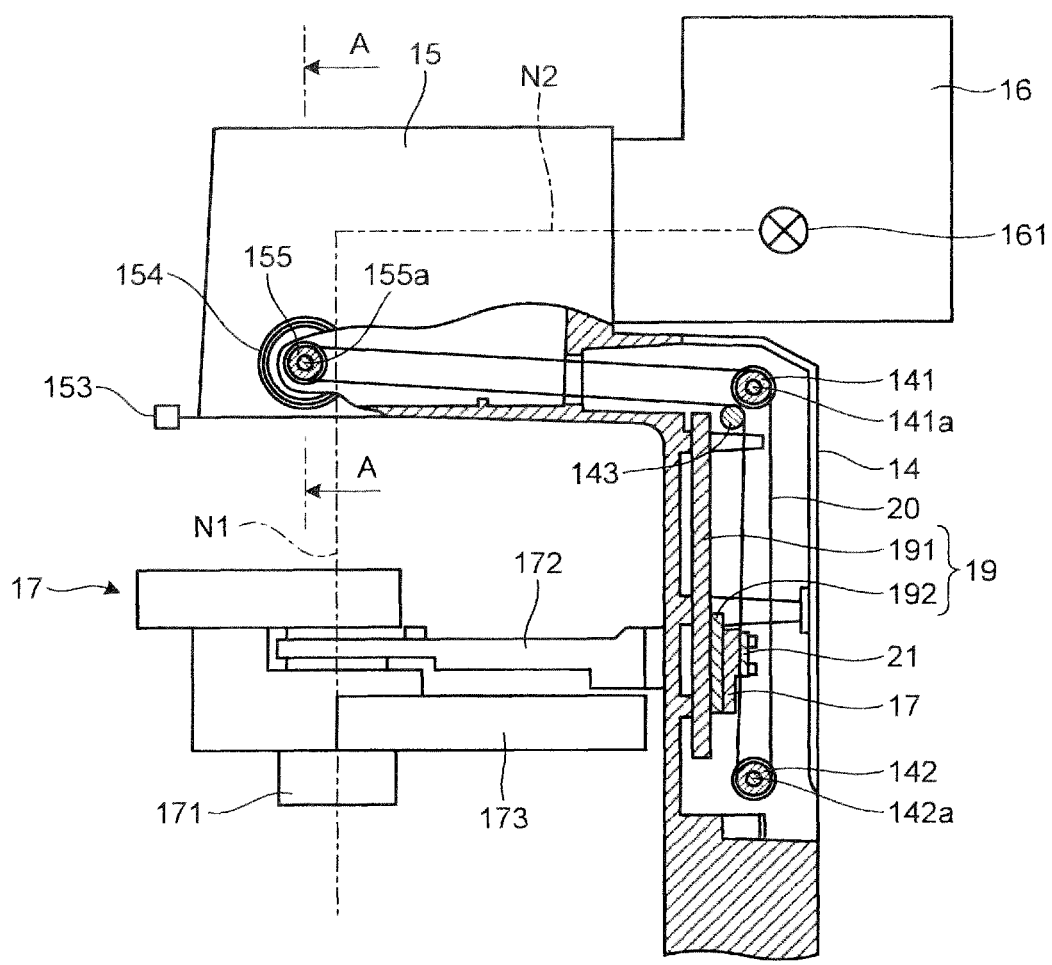
FIG. 2 is a partially cross-sectional view schematically illustrating a configuration of a relevant part of the inverted microscope according to the first embodiment of the invention.
Figure 3:
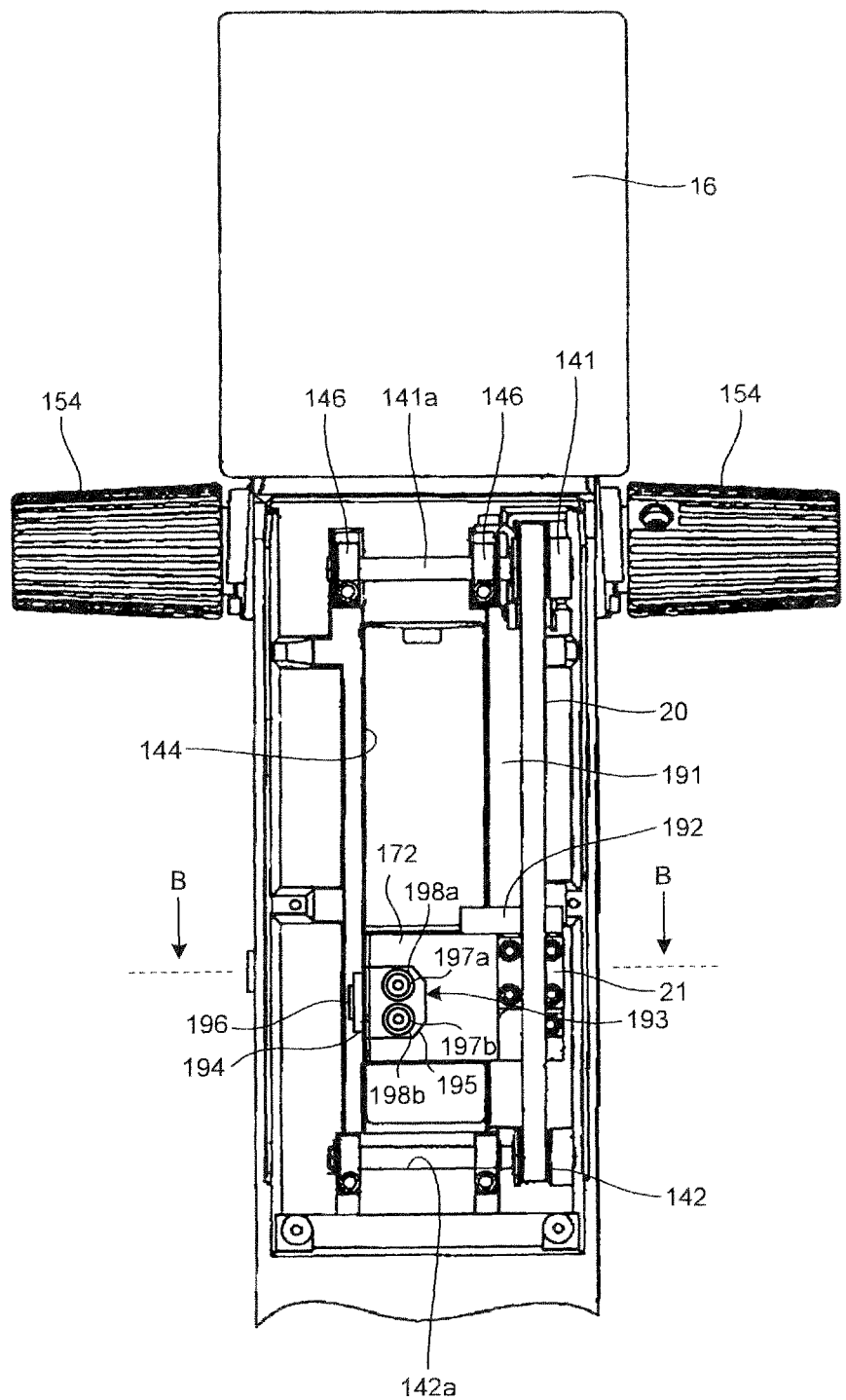
FIG. 3 is a schematic diagram schematically illustrating the configuration of the relevant part of the inverted microscope according to the first embodiment of the invention.
Figure 4:
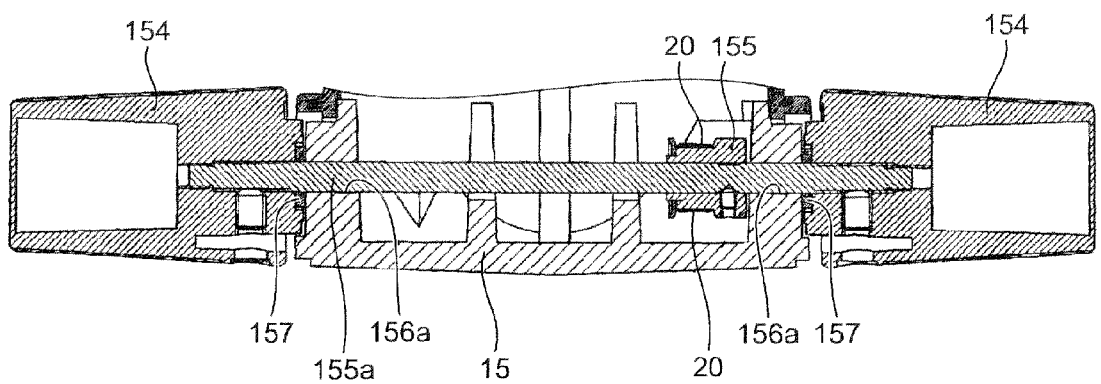
FIG. 4 is a partially cross-sectional view schematically illustrating the configuration of the inverted microscope taken along a line A-A illustrated in FIG. 2.
Figure 5:
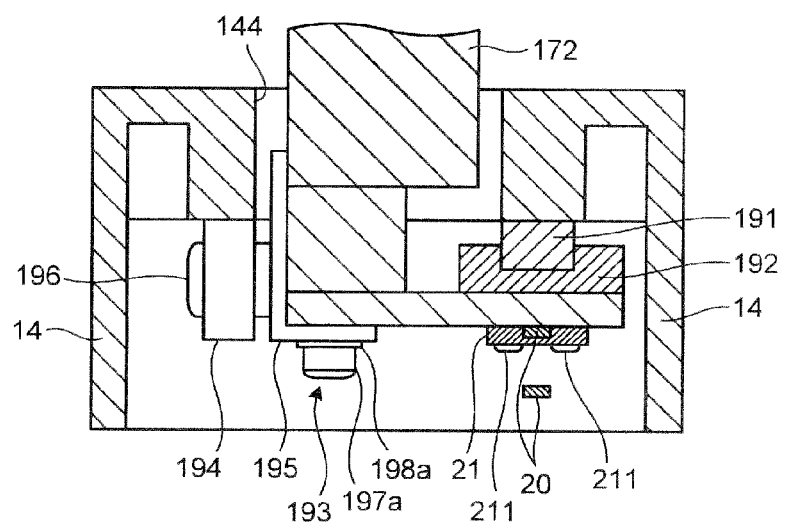
FIG. 5 is a partially cross-sectional view schematically illustrating the configuration of the inverted microscope taken along a line B-B illustrated in FIG. 3.

FIG. 2 is a partially cross-sectional view schematically illustrating a configuration of a relevant part of the inverted microscope according to the first embodiment. FIG. 3 is a schematic diagram schematically illustrating the configuration of the relevant part of the inverted microscope according to the first embodiment of the invention. FIG. 4 is a partially cross-sectional view schematically illustrating the configuration of the inverted microscope taken along a line A-A illustrated in FIG. 2. FIG. 5 is a partially cross-sectional view schematically illustrating the configuration of the inverted microscope taken along a line B-B illustrated in FIG. 3.

The illumination support column 14 includes a condenser moving mechanism 19 which is disposed therein so as to be fixed thereto by a screw and the like. The condenser moving mechanism 19 is configured to move the condenser unit 17 up and down along the optical axis N1.

The condenser moving mechanism 19 includes a linear guide 191 and a moving body 192. The linear guide 191 is formed in a substantially columnar shape extending in parallel to the optical axis N1 and is fixed to the illumination support column 14 by a screw and the like. The moving body 192 supports the condenser holder 172 in a cantilevered manner, is movable up and down along the linear guide 191 (optical axis N1) along with the condenser holder 172, and is fixed to a timing belt 20. The wall surface of the illumination support column 14 on the side connected to the illumination arm portion 15 is formed with a hole in which a part of the condenser holder 172 is inserted, and the hole is an elongated hole 144 which substantially extends in parallel to the optical axis N1. Through the elongated hole 144, the condenser holder 172 protrudes to the outside of the illumination support column 14 and is movable up and down along the linear guide 191.

Further, the illumination support column 14 and the illumination arm portion 15 are equipped with a transmission mechanism which transmits the power of the condenser focusing operation unit 154 to the condenser moving mechanism 19. The transmission mechanism includes a first pulley 141 which is rotatable about a first rotary shaft 141a serving as a center axis, a second pulley 142 which is rotatable about a second rotary shaft 142a serving as a center axis, a third pulley 155 which is rotatable about a third rotary shaft 155a serving as a center axis and having both ends connected to the condenser focusing operation unit 154, the annular timing belt 20 which is formed as a band-like member and is formed so as to connect both end portions of the band shape in the length direction, and a connection member 21 which connects the moving body 192 and the timing belt 20 to each other. Further, the illumination support column 14 includes an idler 143 which is formed in a cylindrical shape having a center axis parallel to the rotary shaft and comes into contact with the timing belt 20 on the cylindrical surface of the cylinder.

The condenser focusing operation unit 154 is connected to the third rotary shaft 155a so as to be rotatable about the third rotary shaft 155a, whereby the power which is generated in response to the rotation about the third rotary shaft 155a is input to the transmission mechanism.

Here, as illustrated in FIG. 5, the timing belt 20 is interposed between the connection member 21 and a surface of the condenser holder 172, the surface being opposite to a surface contacting the moving body 192, and the connection member 21 is fixed by a screw 211. Accordingly, the connection member 21 moves along with the movement of the timing belt 20.

The first pulley 141 (first rotary shaft 141a) is provided at an end portion side near the position where the illumination support column 14 is connected to the illumination arm portion 15. The second pulley 142 (second rotary shaft 142a) is provided at an end portion side opposite to the position where the illumination support column 14 is connected to the illumination arm portion 15. The third pulley 155 (third rotary shaft 155a) is provided at an end portion side of the illumination arm portion 15 opposite to the position where the illumination arm portion 15 is connected to the illumination support column 14, and is positioned closer to the observer (ocular 181) than the optical axis N1. With respect to a plane which passes through the optical axis N1 and is parallel to the third rotary shaft 155a, the condenser focusing operation unit 154 is provided on the same side as the ocular 181.

Here, the line which connects the center axes of the first and second rotary shafts 141a and 142a is substantially parallel to the optical axis N1. Further, the line which connects the center axes of the first and second rotary shafts 141a and 142a is substantially perpendicular to the line which connects the center axes of the first and third rotary shafts 141a and 155a. Note that, the line which connects the center axes of the first and second rotary shafts 141a and 142a and the line which connects the center axes of the first and third rotary shafts 141a and 155a may not be perpendicular to each other if they are formed along the illumination support column 14 and the illumination arm portion 15.

The timing belt 20 is suspended in a manner such that the inner side thereof comes into contact with the first to third pulleys 141, 142, and 155, and the outer side thereof comes into contact with the idler 143. Because of the contact with the idler 143, the timing belt 20 is disposed so as not to come into contact with the wall surfaces of the illumination support column 14 and the illumination arm portion 15.

Further, the timing belt 20 meshes with the respective pulleys at the contact portions thereof, and moves so as to follow the rotation of the pulley (for example, the third pulley 155). Accordingly, the timing belt 20 may be moved by rotating the condenser focusing operation unit 154 which is connected to the third rotary shaft 155a. Further, the idler 143 is movable up and down along the direction of the optical axis N1, and is capable of adjusting the suspended state of the timing belt 20 according to the arrangement position of the idler 143.

Figure 6:
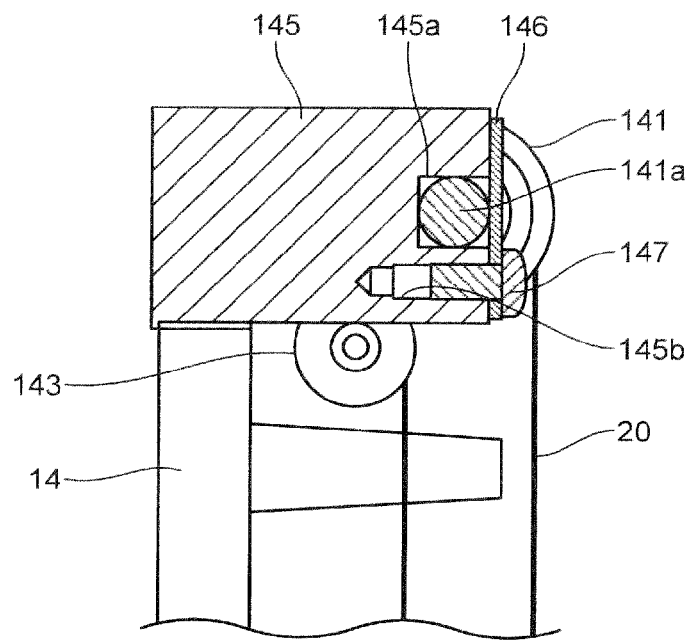
FIG. 6 is a partially cross-sectional view schematically illustrating the configuration of the relevant part of the inverted microscope according to the first embodiment of the invention.

FIG. 6 is a partially cross-sectional view schematically illustrating a configuration near the first pulley 141. As illustrated in FIG. 6, the first rotary shaft 141a is supported by a bearing member 145 which is fixed to the illumination support column 14. The bearing member 145 is provided at each of both ends of the first rotary shaft 141a, and includes a concave bearing portion 145a. Both ends of the first rotary shaft 141a are held by the concave internal spaces of the bearing portions 145a of the respective bearing members 145. Further, in the bearing member 145, the concave aperture end portion of the bearing portion 145a is covered by a plate-like support member 146.

Specifically, one end side of the first rotary shaft 141a is inserted into a space which is formed by covering the concave aperture end portion of the bearing portion 145a by the support member 146, and is held so as to be rotatable about the center axis. The other end side of the first rotary shaft 141a is also rotatably held by the same configuration. Note that, the support member 146 is fixed to the bearing member 145 by a screw 147 which is inserted through a screw hole 145b formed in the bearing member 145.

The method of holding the rotary shaft is not limited to the configuration of the bearing portion 145a and the support member 146. For example, the rotary shaft may be prevented from coming off by narrowing the aperture end portion of the bearing portion 145a, or may be held in a space which is formed by deforming a sheet metal. Further, the second rotary shaft 142a and the third rotary shaft 155a are also rotatably held by the same configuration.

The first pulley 141 and the second pulley 142 are respectively screw-fixed to the first rotary shaft 141a and the second rotary shaft 142a so that the rotary shaft and the pulley rotate together.

Further, the third rotary shaft 155a is held by a bearing portion 156a (see FIG. 4) having the above-described configuration, the third pulley 155 is screw-fixed thereto so as to rotate together, and the third rotary shaft protrudes from the side surface of the illumination arm portion 15 so as to be perpendicular to the optical axis N1 and the optical axis N2. The third rotary shaft 155a is connected to the condenser focusing operation unit 154 through press-inserting and screw-fixing at the end portion side of the protruding portion (see FIG. 4).

Note that, the first rotary shaft 141a and the second rotary shaft 142a are positioned in the axial direction by E-rings which are respectively positioned and fixed to both ends thereof. Further, the third rotary shaft 155a is positioned in the horizontal direction by the condenser focusing operation unit 154 fixed to both ends thereof. An annular sliding member 157 is inserted between the condenser focusing operation unit 154 and the bearing portion 156a which are held at each of both ends of the third rotary shaft 155a.

Here, the respective components of the transmission mechanism are arranged at positions capable of ensuring the light flux of the illumination light so as not to disturb the optical path of the illumination light (for example, see FIGS. 3 and 4).

As described above, in the inverted microscope 1 according to the first embodiment, the rotational moving force of the condenser focusing operation unit 154 is transmitted from the third rotary shaft 155a to the timing belt 20 through the third pulley 155, and the position of the condenser 171 may be adjusted by moving the condenser moving mechanism 19 (moving body 192) through the connection member 21 and the condenser holder 172 which are fixed to the timing belt 20 so as to be movable together.

Specifically, first, the condenser focusing operation unit 154 which is provided in the illumination arm portion 15 is rotated. When the condenser focusing operation unit 154 rotates, the rotational moving force is transmitted from the third rotary shaft 155a to the timing belt 20 through the third pulley 155. At this time, the first rotary shaft 141a, the first pulley 141, the second rotary shaft 142a, and the second pulley 142 rotate with the movement of the timing belt 20. The rotational moving force which is transmitted to the timing belt 20 is transmitted to the moving body 192 of the condenser moving mechanism 19 through the connection member 21 and the condenser holder 172, and is converted into a force in which the moving body 192 moves along the linear guide 191. When the moving body 192 moves up and down along the linear guide 191, the condenser holder 172 which holds the condenser 171 moves up and down. As described above, the observer adjusts the height of the condenser 171 to a position focused to the field stop by moving the condenser 171. Further, the observer appropriately adjusts the diameter (slit) of the field stop by operating the field stop operation unit 153 depending on the specimen.

Further, the condenser holder 172 is equipped with a rotation preventing mechanism 193 which prevents the rotation of the condenser holder 172 on the plane perpendicular to the optical axis N1. The rotation preventing mechanism 193 prevents the rotation of the condenser holder 172 in a manner such that a bearing 194 which is rotatable with the upward and downward movement of the condenser holder 172 comes into contact with the inner wall surface of the illumination support column 14 so as to roll thereon. The rotation preventing mechanism 193 includes the bearing 194 and a block member 195 which holds the bearing 194.

The bearing 194 is connected to the block member 195 by a fixing screw 196. Further, the block member 195 is fixed to the condenser holder 172 by fixing screws 197a and 197b.

Spring washers 198a and 198b are respectively fitted between the condenser holder 172 and the fixing screws 197a and 197b.

As for the rotation preventing mechanism 193, the rotation on the plane perpendicular to the optical axis N1 is prevented in a manner such that the bearing 194 comes into contact with the inner wall surface of the illumination support column 14, and the spring washers 198a and 198b absorb a rotation rattling which is slightly generated with the upward and downward movement of the condenser holder 172 (see FIG. 5).

According to the first embodiment, since the condenser focusing operation unit which is connected to the rotary shaft is supported above the condenser unit so as to be positioned on the side of the observer (ocular) relative to the optical axis of the objective lens, it is possible to improve the operability when carrying out the focusing operation of the condenser. Further, it is possible to further improve the operation efficiency by providing the condenser focusing operation unit at the above-described position and providing the field stop therearound. Further, it is possible to manufacture the inverted microscope at low cost by using the timing belt as the transmission mechanism.

In the related art, since the condenser focusing operation unit is disposed near the stage, when another unit such as a manipulator is provided, the condenser focusing operation unit is positioned at the attachment portion of the unit. Accordingly, there is a need to adjust the position/configuration of the unit or the position/configuration of the condenser focusing operation unit, or it is difficult to access the condenser focusing operation unit due to the attachment unit. On the other hand, in the inverted microscope according to the first embodiment, even when another unit such as a manipulator is provided, another unit such as a condenser focusing operation unit and a manipulator may be operated without causing the above-described problems.

Note that, a case has been described in which a linear guide is used as the condenser moving mechanism, but the invention is not limited thereto. For example, a known structure of the combination of a bar guide and a linear bush and the combination of a rack and a pinion may be used. Further, a case has been described in which the timing belt and the pulley are used as the components of the transmission mechanism. However, for example, known components such as a rack and a pinion may be used.

Further, a case has been described in which one timing belt is used as the component of the transmission mechanism. However, plural timing belts may be used so as to separately transmit a rotational moving force between the first rotary shaft 141a and the second rotary shaft 142a and between the first rotary shaft 141a and the third rotary shaft 155a. In this case, the number of the rotary shafts and the pulleys is appropriately increased. Further, a case has been described in which the idler 143 has a cylindrical shape, but a plate-like member which is curved in an arc shape may be used so that the curved surface comes into contact with the timing belt.

Here, a case has been described in which the condenser moving mechanism is provided inside the illumination support column, but may be provided outside the illumination support column and be provided in the illumination arm portion. Further, the condenser focusing operation unit is provided at both sides of the illumination arm portion, but may be provided at any one side. In the first embodiment, the condenser focusing operation unit is just used to largely move the timing belt in response to the rotation amount. However, a minute moving operation unit which minutely moves the timing belt by a small amount compared to the rotation amount may be coaxially provided with the condenser focusing operation unit (third rotary shaft).

Further, a case has been described in which the condenser focusing operation unit 154 is provided above the condenser holder 172 so as to be positioned on the side of the observer (ocular 181) relative to the optical axis N1 of the objective lens 11. However, as far as the condenser focusing operation unit is provided above the condenser unit 17 (the condenser 171 and/or the condenser holder 172), the condenser focusing operation unit may be disposed at the side surface of the illumination arm portion 15 in the direction perpendicular to the optical axis N1 and the optical axis N2, for example.

Figure 7:
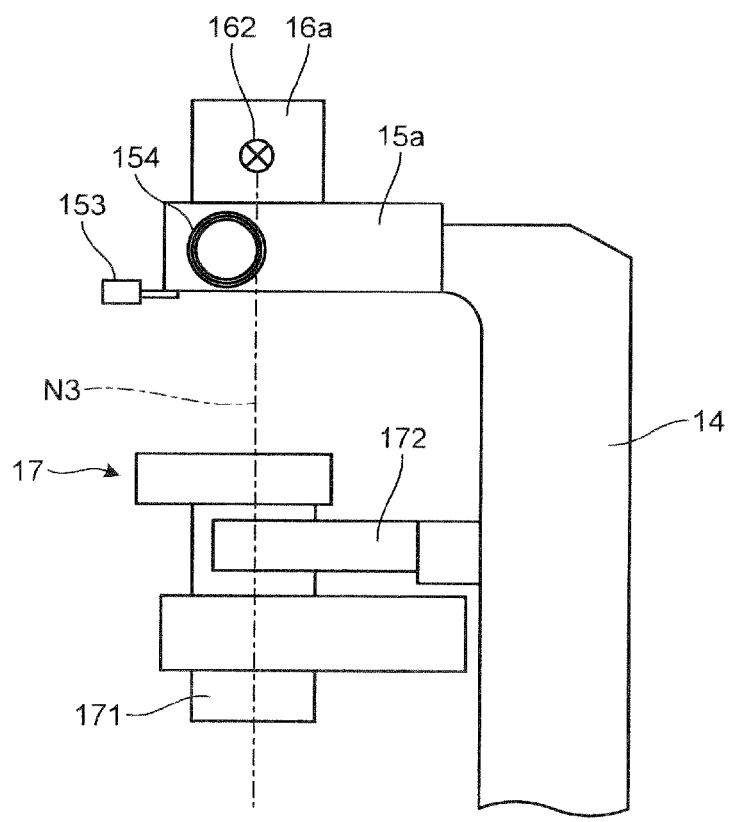
FIG. 7 is a partially cross-sectional view illustrating a configuration of a relevant part of an inverted microscope according to Modified Example 1-1 of the first embodiment of the invention.

FIG. 7 is a partially cross-sectional view illustrating a configuration of a relevant part of an inverted microscope according to Modified Example 1-1 of the first embodiment of the invention. In the first embodiment, the light which is emitted from the light source is reflected by the reflection mirror 152 disposed in the illumination arm portion 15 and is introduced along the optical axis of the objective lens 11. However, as in the case of Modified Example 1-1 illustrated in FIG. 7, for example, a lamp housing 16a in which an LED light source 162 is mounted on an illumination arm portion 15a may be provided on the optical axis N3 of the objective lens. Note that, the optical axis N3 corresponds to the optical axis N1, and matches the optical axis of the objective lens 11 illustrated in FIG. 1. In this way, the position of the light source may be appropriately changed.

Second Embodiment

Figure 8:
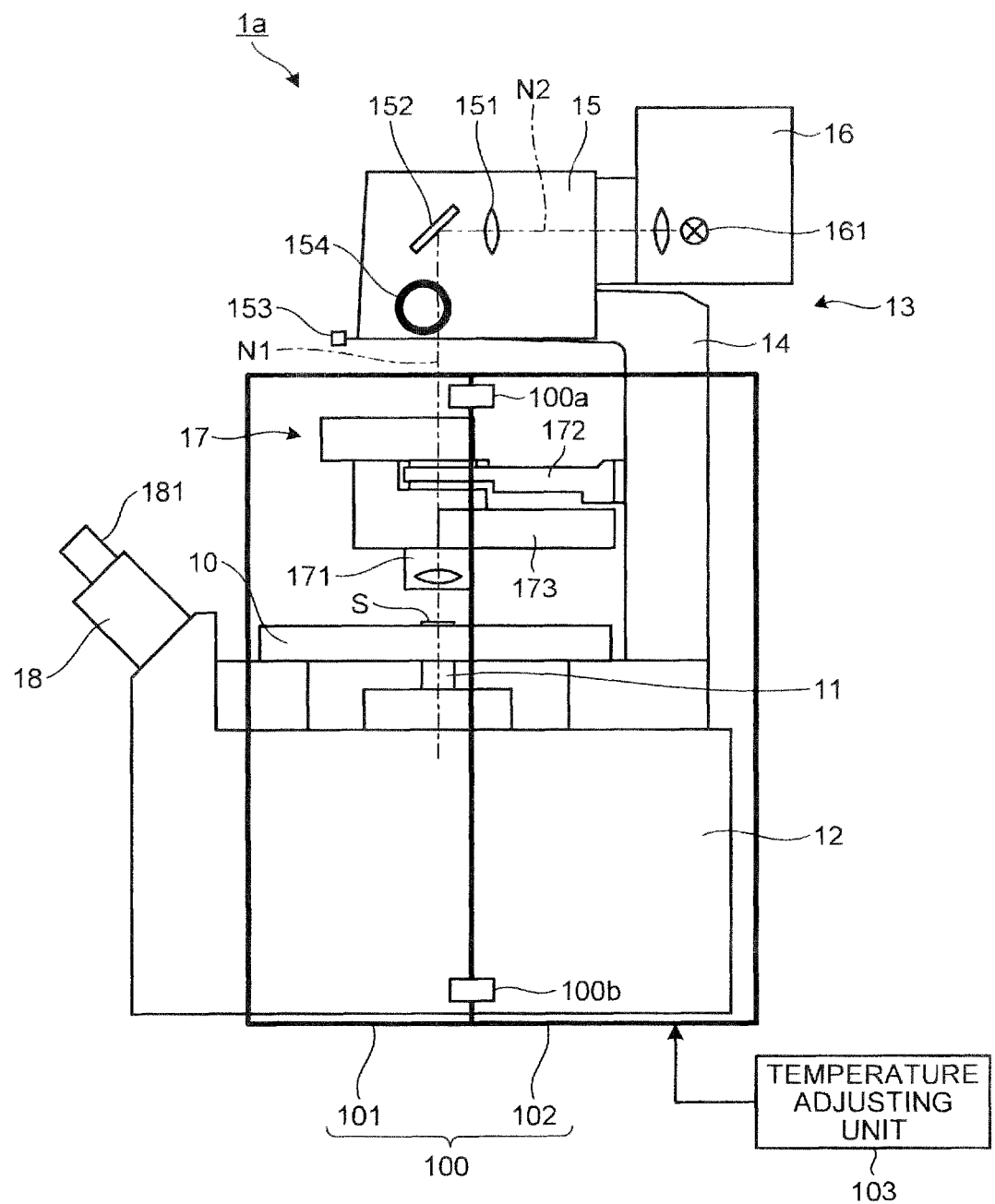
FIG. 8 is a schematic diagram illustrating an overall configuration of an inverted microscope according to a second embodiment of the invention.

FIG. 8 is a schematic diagram illustrating a configuration of an inverted microscope according to a second embodiment. Note that, the same reference numerals will be given to the same components as those of FIG. 1 and the like. An inverted microscope 1a according to the second embodiment includes at least the stage 10, the objective lens 11, a part of the illumination support column 14, a heat-retention box 100 which covers the condenser unit 17, and a temperature adjusting unit 103 which adjusts the temperature of the internal space of the heat-retention box 100 in addition to the configuration of the first embodiment.

The heat-retention box 100 includes first and second members 101 and 102 each of which is formed in a substantially columnar shape having a space formed therein and each of which has an opened surface (aperture) formed in the same shape. The first member 101 and the second member 102 are fixed by fixing members 100a and 100b while the internal space accommodates the stage 10, the objective lens 11, a part of the illumination support column 14, and the condenser unit 17, so that the inside thereof is substantially sealed. The heat-retention box 100 may maintain the environment temperature of keeping the specimen S at a desired temperature in a manner such that the temperature of the substantially columnar internal space formed by the first and second members 101 and 102 is adjusted by the temperature adjusting unit 103.

According to the second embodiment, although the heat-retention box which adjusts the temperature of the environment temperature of the specimen on the stage is installed, the condenser focusing operation unit connected to the rotary shaft is supported above the condenser unit to be positioned on the side of the observer (ocular) relative to the optical axis of the objective lens so that the condenser focusing operation unit is positioned outside the heat-retention box. Accordingly, it is possible to improve the operability when carrying out the focusing operation of the condenser while adjusting the temperature of the specimen.

In the related art, the condenser focusing operation unit is disposed near the stage, and the condenser focusing operation unit is positioned in the installation region of the heat-retention box when the heat-retention box is disposed. There is a need to provide the structure of exposing the condenser focusing operation unit to the outside in the heat-retention box. On the other hand, in the second embodiment, since the condenser focusing operation unit is positioned outside the heat-retention box, there is no need to provide the above-described configuration in the heat-retention box. Accordingly, it is possible to simply install the heat-retention box and maintain the operability of the condenser focusing operation unit.

Third Embodiment

Figure 9:
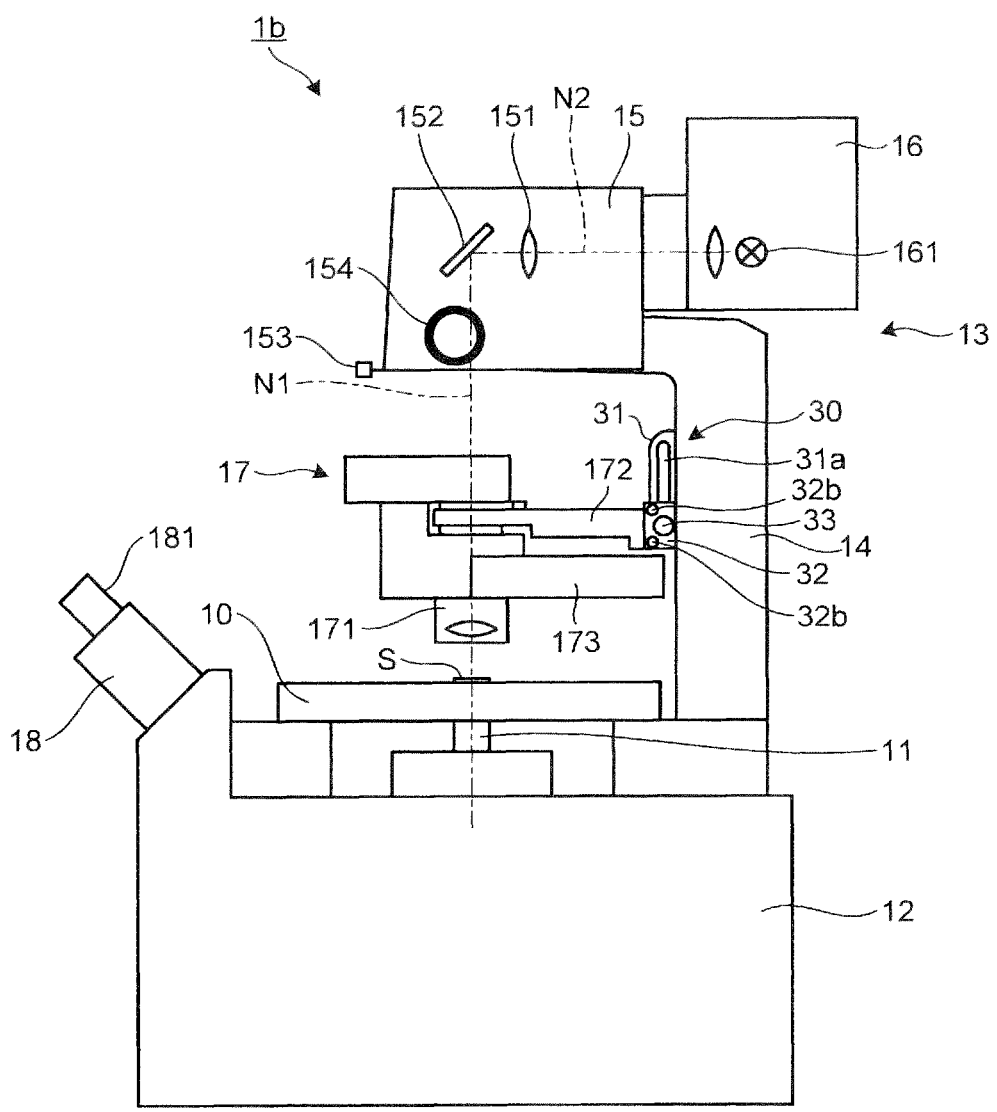
FIG. 9 is a schematic diagram illustrating an overall configuration of an inverted microscope according to a third embodiment of the invention.
Figure 10:
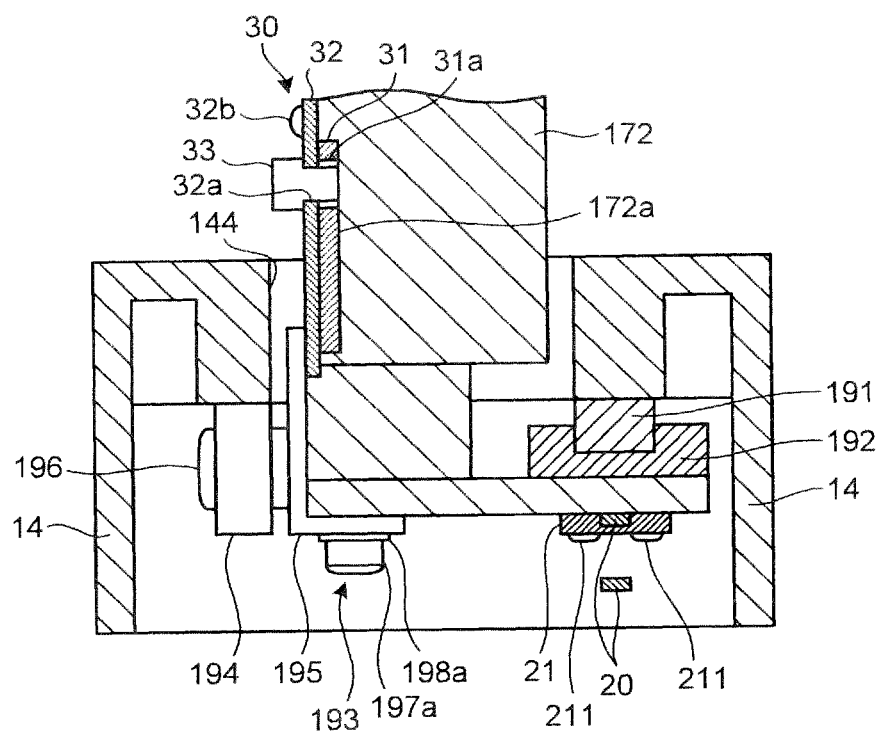
FIG. 10 is a partially cross-sectional view schematically illustrating the configuration of the inverted microscope taken along the line B-B illustrated in FIG. 3.
Figure 11:
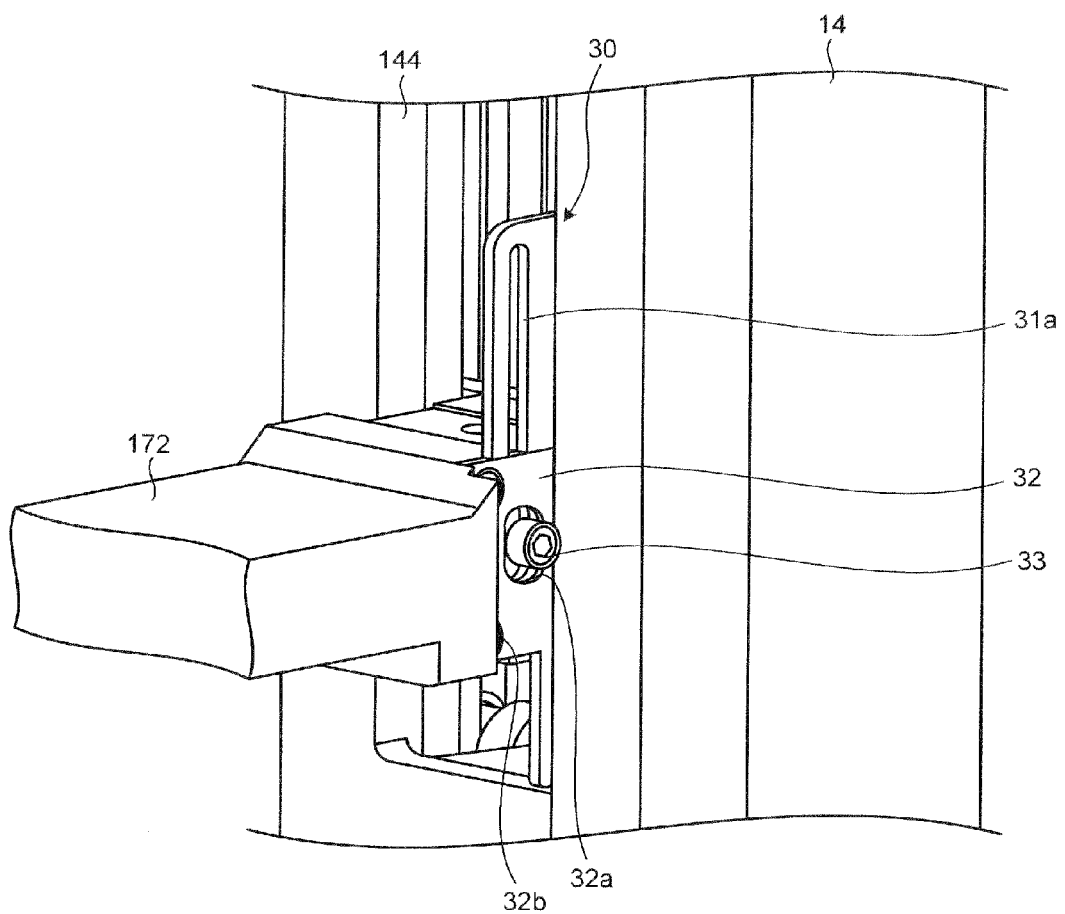
FIG. 11 is a perspective view illustrating a configuration of a relevant part of the inverted microscope according to the third embodiment of the invention.
Figure 12:
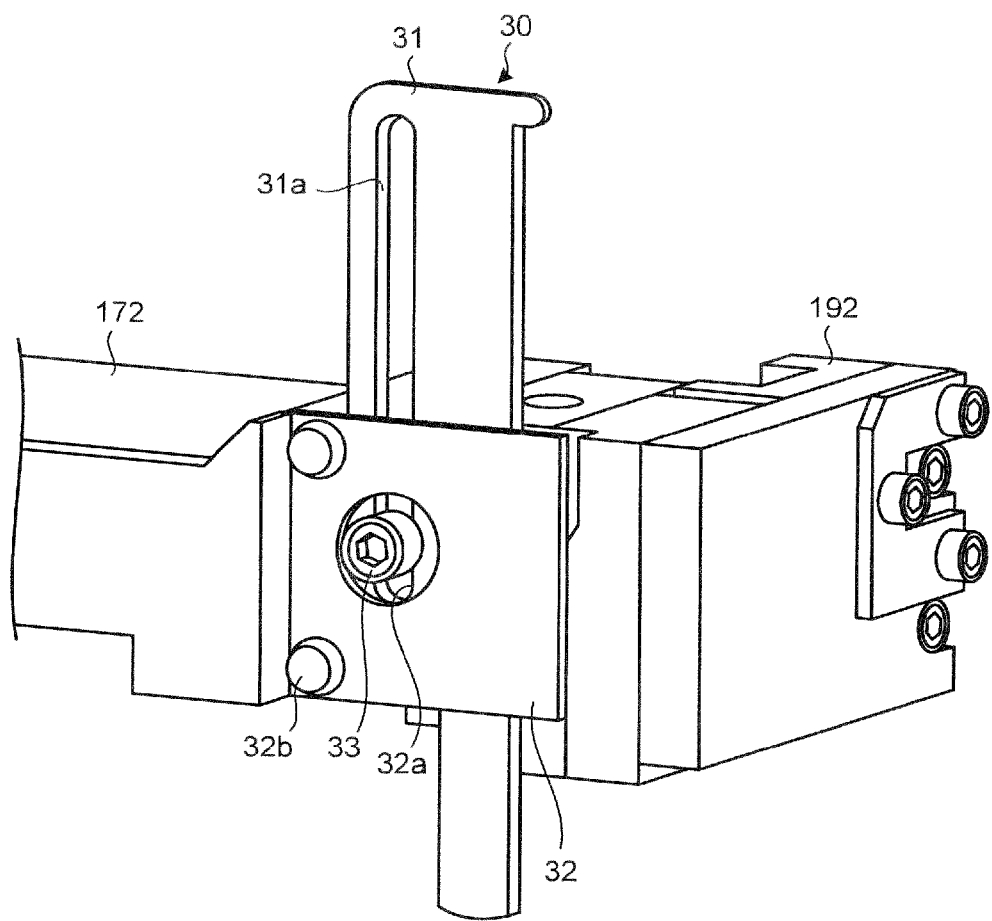
FIG. 12 is a perspective view illustrating the configuration of the relevant part of the inverted microscope according to the third embodiment of the invention.

FIG. 9 is a schematic diagram illustrating an overall configuration of an inverted microscope 1b according to a third embodiment. FIG. 10 is a partially cross-sectional view schematically illustrating a configuration of the inverted microscope 1b taken along the line B-B illustrated in FIG. 3. FIG. 11 is a perspective view illustrating a configuration of a movement regulating unit of the inverted microscope 1b according to the third embodiment. FIG. 12 is a perspective view illustrating the configuration of the movement regulating unit of the inverted microscope 1b according to the third embodiment. Note that, the same reference numerals will be given to the same components as those of FIG. 1 and the like. The inverted microscope 1b according to the third embodiment includes a movement regulating unit 30 which regulates the movement of the condenser unit 17 along the optical axis N1 in addition to the configuration of the first embodiment.

The movement regulating unit 30 includes a stopper 31 which is provided on the wall surface of the condenser holder 172, is partially positioned inside the elongated hole 144, is formed in a plate shape extending in the direction of the optical axis N1, and is movable in the direction of the optical axis N1, a regulation plate 32 which is attached to the condenser holder 172 and holds the stopper 31, and a fixing screw 33 which penetrates the stopper 31 and the regulation plate 32 and is fixed to the condenser holder 172.

The stopper 31 is equipped with an elongated hole 31a which extends in the length direction of the plate surface and penetrates the stopper in the plate thickness direction. Note that, the length direction of the elongated hole 31a is parallel to the optical axis N1 while the stopper 31 is attached to the condenser holder 172. Further, the regulation plate 32 is equipped with a through hole 32a which penetrates the regulation plate in the plate thickness direction and into which the fixing screw 33 is inserted. The condenser holder 172 and the regulation plate 32 are fixed by a screw 32b.

The fixing screw 33 penetrates the elongated hole 31a and the through hole 32a, and is threaded into a screw hole (not illustrated) formed in the condenser holder 172. At this time, the stopper 31 is interposed between the wall surface of the condenser holder 172 and the regulation plate 32, and is fastened by the fixing screw 33, thereby fixing the position of the stopper 31 with respect to the condenser holder 172.

Further, the condenser holder 172 is equipped with a concave portion 172a (see FIG. 10) formed in the side surface, on which the movement regulating unit 30 (stopper 31) is provided, and is formed in a concave shape toward the outer surface of the side surface. The concave portion 172a forms a space which extends along the direction of the optical axis N1. Since the stopper 31 is accommodated in the space, the movement direction of the stopper 31 is regulated. Accordingly, the stopper 31 is movable in a reciprocating manner in the direction of the axis N1.

A case is considered in which the condenser unit 17 needs to be moved upward but the current position of the condenser is desired to be retained, such as the case of replacing the specimen S. In such a case, the movement regulating unit 30 moves the stopper 31 toward the stage 10 (downward in the drawing) to be brought into contact with the bottom surface of the elongated hole 144 while maintaining the condenser position desired to be retained. Here, the positional relation between the stopper 31 and the condenser holder 172 is fixed by fastening the fixing screw 33, so that the return position of the condenser holder 172 is determined by the positional relation between the stage 10 and the condenser 171.

Then, the condenser holder 172 is moved toward the illumination arm portion 15 (upward in the drawing) so as to widen the gap between the condenser 171 and the stage 10 (specimen S), and the replacement, the adjustment, and the like of the specimen S are carried out. Then, when the condenser holder 172 is moved toward the stage 10 (downward in the drawing) so that the stopper 31 comes into contact with the bottom surface of the elongated hole 144, the condenser 171 is returned to the condenser position before the manipulation of the specimen S.

According to the third embodiment, since the condenser focusing operation unit connected to the rotary shaft is supported above the condenser unit so as to be positioned on the side of the observer (ocular) relative to the optical axis of the objective lens, it is possible to improve the operability when carrying out the focusing operation of the condenser. Further, since the condenser focusing operation unit is disposed at the above-described position and the field stop is disposed therearound, it is possible to further improve the operation efficiency. Further, it is possible to manufacture the inverted microscope at low cost by using the timing belt as the transmission mechanism.

In the related art, when the condenser 171 retreats from the vicinity of the stage 10 for the replacement, the adjustment, and the like of the specimen S, it is difficult to return the condenser to the position before the retreat. A method is also exemplified which moves the condenser 171 away from the specimen S by inclining the illumination support column 14 while the condenser position is maintained. However, a space which is used to incline the illumination support column 14 needs to be ensured in rear of the microscope. Also, in a case where the condenser 171 is inserted in a container such as a beaker, there is a concern that an interference of the container wall surface and the condenser 171 may be caused, which disturbs the inclination of the illumination support column.

In contrast, according to the third embodiment, even when the condenser 171 retreats from the stage 10 for the replacement, the adjustment, and the like of the specimen S, since the return position is determined by the stopper 31, the re-observation of the specimen S may be easily carried out.

Figure 16:
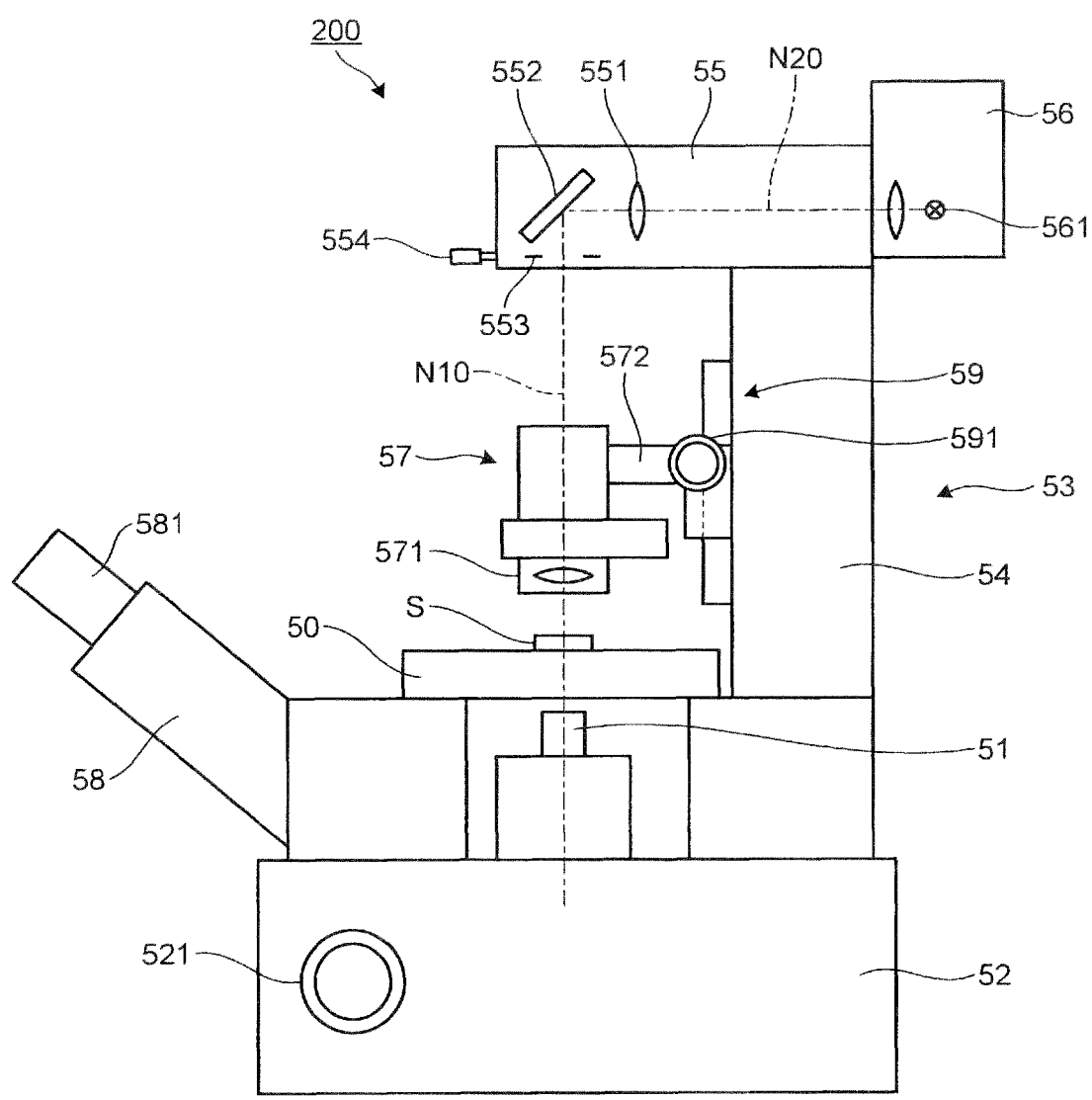
FIG. 16 is a schematic diagram illustrating an overall configuration of an inverted microscope of the related art.

Note that, in the third embodiment, a case has been described in which the movement regulating unit 30 is provided in the condenser holder 172, but may be provided in the illumination support column 14. Further, the movement regulating unit 30 may be provided in the inverted microscope of the related art illustrated in FIG. 16 except for the configuration of the third embodiment. That is, the movement regulating unit 30 may be disposed regardless of the condenser focusing operation unit 154.

Further, in the third embodiment, a case has been described in which the movement regulating unit 30 is formed in a plate shape, but may be formed in a bar shape if the movement regulating unit may be fixed to the condenser holder 172. Further, a case has been described in which the stopper 31 is moved by being guided by the concave portion 172a of the condenser holder 172 and the regulation plate 32. However, the movement of the stopper 31 may be guided, for example, in a manner such that the stopper 31 is equipped with a guiding elongated hole and a regulation pin which is inserted through the elongated hole of the stopper 31 is attached to the condenser holder 172.

Fourth Embodiment

Figure 13:
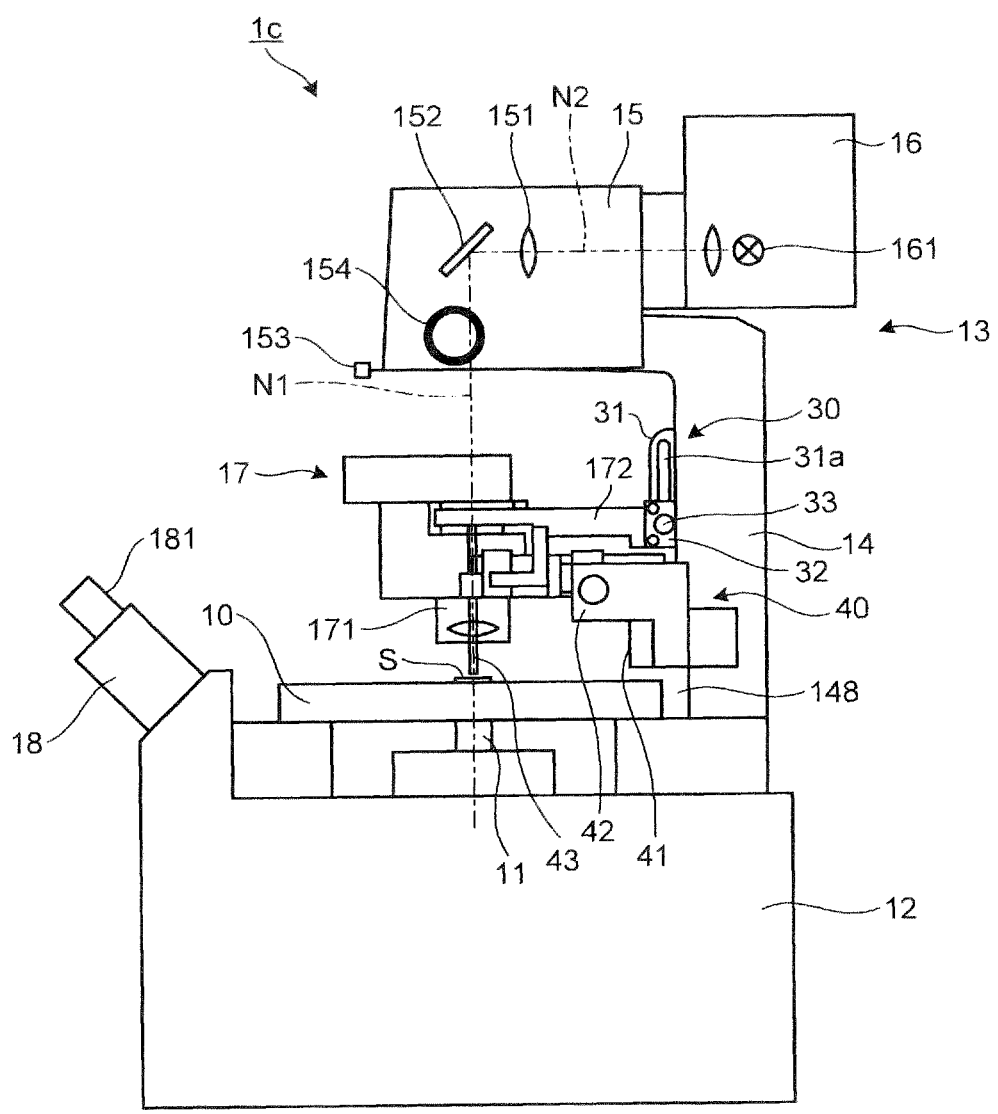
FIG. 13 is a schematic diagram illustrating an overall configuration of an inverted microscope according to a fourth embodiment of the invention.
Figure 14:
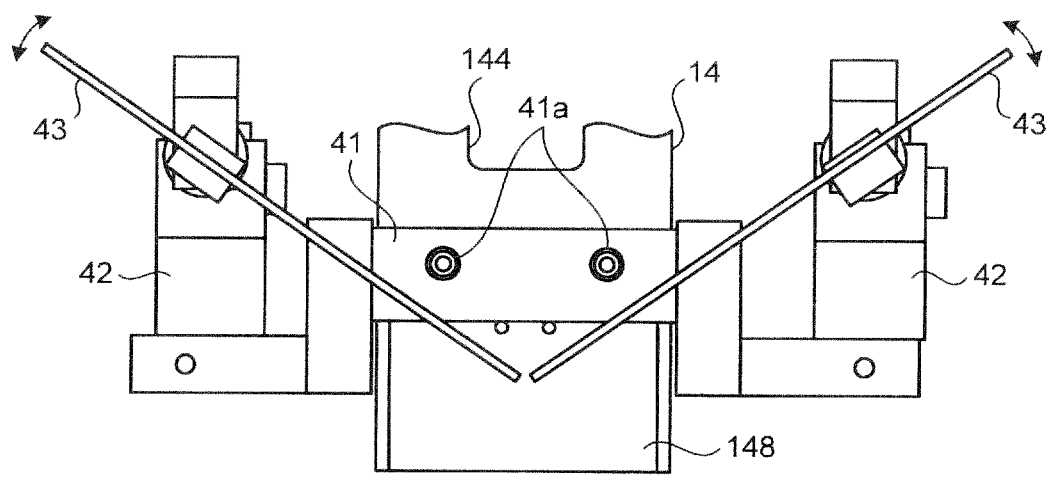
FIG. 14 is a front view illustrating the configuration of the relevant part of the inverted microscope according to the fourth embodiment of the invention.

FIG. 13 is a schematic diagram illustrating an overall configuration of an inverted microscope 1c according to a fourth embodiment. FIG. 14 is a front view illustrating a configuration of a relevant part of the inverted microscope 1c according to the fourth embodiment. Note that, the same reference numerals will be given to the same components as those of FIG. 1 and the like. The inverted microscope 1c according to the fourth embodiment includes a manipulator 40 which is able to manipulate the specimen S in addition to the configuration of the third embodiment.

The manipulator 40 includes a base portion 41 which is fixed to the illumination support column 14, two shoulder portions 42 which extend from both ends of the base portion 41, and an operation needle 43 which is attached to the end portion opposite to the base portion 41 of each shoulder portion 42 and is used to manipulate the specimen S. Each shoulder portion 42 holds the needle 43 such that the needle 43 is rotatable on the plane that passes the optical axis N1.

The illumination support column 14 is formed in a stepped shape (notched shape) in which the surface facing the stage 10 and positioned on the side of the microscope body 12 is stepped or notched. The space (stage stroke retreat space 148) which is formed by the stepped shape is provided so as to retreat from the stroke range of the stage 10 moving on the plane perpendicular to the optical axis N1, which ensures the movable region of the stage 10. By using the stage stroke retreat space 148, the stroke range of the stage 10 may be ensured, and a decrease in movable region of the stage 10 due to the attachment of the manipulator 40 may be suppressed. Note that, the stage stroke retreat space 148 is not limited to the stepped shape, and may be formed in a tapered shape.

When the specimen S is replaced, the operation needle 43 retreats from the vicinity of the specimen S, and the above-described movement regulating unit 30 is operated, thereby easily replacing the specimen S. Further, even when the operation needle 43 is replaced, the operation needle 43 may be easily replaced by operating the above-described movement regulating unit 30.

According to the fourth embodiment, since the condenser focusing operation unit which is connected to the rotary shaft is supported above the condenser unit so as to be positioned on the side of the observer (ocular) relative to the optical axis of the objective lens, it is possible to improve the operability when carrying out the focusing operation of the condenser regardless of the attachment of the manipulator. Also, it is possible to further improve the operation efficiency by disposing the condenser focusing operation unit at the above-described position and disposing the field stop therearound. Further, it is possible to manufacture the inverted microscope at low cost by using the timing belt as the transmission mechanism.

Further, according to the fourth embodiment, even when the condenser 171 retreats from the stage 10 for the replacement, the adjustment, and the like of the specimen S, since the return position is determined by the stopper 31, re-observation of the specimen S may be easily carried out. Note that, the fourth embodiment may be also applied to the configuration without the movement regulating unit 30.

Further, according to the fourth embodiment, the condenser 171 is positioned away from the specimen S to an extent required to ensure the stroke of the stage 10, and the manipulator 40 is fixed to the illumination support column 14 at a position on the side of the stage 10. Thus, the distance between the manipulator attachment position and the specimen S is fixed. Because the shoulder portions 42 do not become long, the rigidity at the manipulator attachment position can be ensured.

Figure 15:
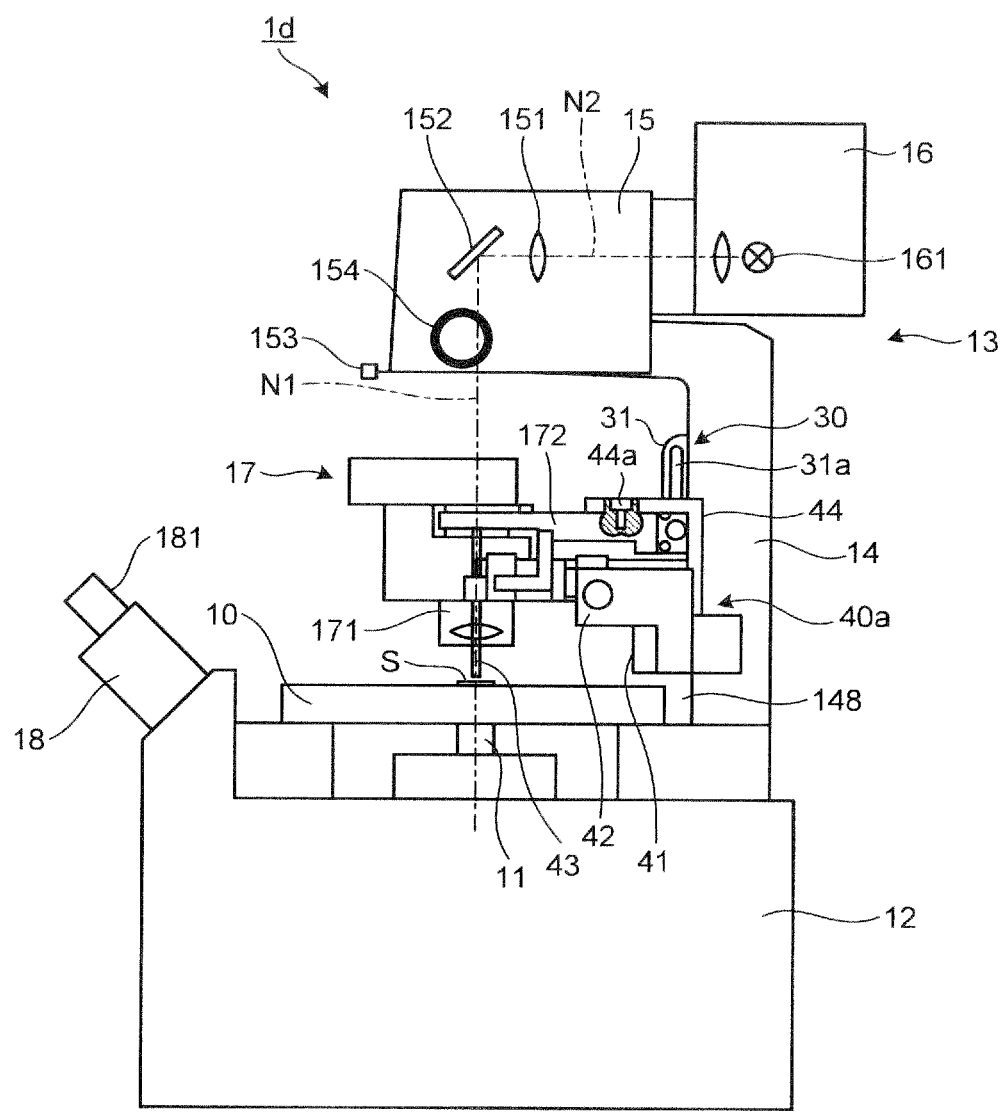
FIG. 15 is a schematic diagram illustrating an overall configuration of an inverted microscope according to Modified Example 4-1 of the fourth embodiment of the invention.

FIG. 15 is a schematic diagram illustrating an overall configuration of an inverted microscope 1*d* according to Modified Example 4-1 of the fourth embodiment. In the fourth embodiment, a case has been described in which the manipulator 40 is fixed to the illumination support column 14, but the manipulator may be fixed to the condenser holder 172.

A manipulator 40*a* illustrated in FIG. 15 includes a base portion 44 which is fixed to the condenser holder 172, two shoulder portions 42 which extend from both ends of the base portion 44, and the operation needle 43 which is attached to the end portion opposite to the base portion 44 of each shoulder portion 42 and is used to manipulate the specimen S. Each shoulder portion 42 holds the operation needle 43 such that the operation needle 43 is rotatable on the plane that passes the optical axis N1. The base portion 44 is fixed to the condenser holder 172 by a screw 44*a*.

In Modified Example 4-1, since the manipulator 40*a* is fixed to the condenser holder 172, the manipulator 40*a* also moves with the movement of the condenser holder 172. By using the above-described movement regulating unit 30, the condenser 171 may return to the position before the replacement of the specimen S, and the manipulator 40*a* may return to the position before the replacement of the specimen S, thereby further facilitating the re-observation of the specimen S.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope comprising:
    a stage configured to have a specimen placed thereon;
    a light source unit which has a light source which irradiates light to the specimen on the stage;
    an objective lens which focuses at least observation light from the specimen on the stage;
    a body unit which holds at least the objective lens;
    a condenser which is provided on an optical axis of the objective lens;
    a condenser holding unit which holds the condenser;
    a condenser moving mechanism which movably supports the condenser holding unit and moves the condenser holding unit along the optical axis;
    a transmission mechanism which transmits power for moving the condenser to the condenser moving mechanism;
    an input unit which inputs the power to the transmission mechanism;
    a support column having a first end that is connected to the body unit, the support column extending in an extension direction that is substantially parallel to the optical axis; and
    an illumination support portion which extends from a second end of the support column in a direction substantially perpendicular to the extension direction of the support column, wherein the illumination support portion holds the light source unit and includes a reflection mirror provided inside the illumination support portion and configured to output the light from the light source unit to the condenser,
    wherein the transmission mechanism includes a timing belt configured to transmit the power to the condenser moving mechanism in response to operation of the input unit, and
    wherein the timing belt is provided inside the support column and the illumination support portion, and is disposed below the reflection mirror.

2. The inverted microscope according to claim 1, wherein:
    the body unit includes an ocular,
    the input unit is rotatable about a rotary shaft and inputs the power in response to a rotation about the rotary shaft, and
    the input unit and the ocular are provided on the same side with respect to a plane passing through the optical axis and being parallel to the rotary shaft.

3. The inverted microscope according to claim 1, wherein the illumination support portion includes a field stop which adjusts a visual field and a field stop operation unit which operates the field stop.

4. The inverted microscope according to claim 1, further comprising:
    a heat-retention box which forms a substantially columnar internal space and accommodates at least the stage and the condenser in the internal space; and
    a temperature adjusting unit which adjusts a temperature of the internal space of the heat-retention box.

5. The inverted microscope according to claim 1, further comprising:
    a movement regulating unit which regulates a movement of the condenser holding unit in a direction parallel to the optical axis of the objective lens.

6. The inverted microscope according to claim 1, further comprising:
    a manipulator which is attached to the condenser holding unit and manipulates the specimen.

7. The inverted microscope according to claim 1, further comprising:
    a manipulator which is attached to the support column and manipulates the specimen.

8. The inverted microscope according to claim 1, wherein the support column includes a stage stroke retreat space which is provided to retreat from a stroke range of the stage.

9. The inverted microscope according to claim 1, wherein the input unit is provided above the condenser holding unit.

10. The inverted microscope according to claim 1, wherein the input unit is provided on the illumination support portion.

* * * * *